(12) United States Patent
Knieper et al.

(10) Patent No.: US 12,372,124 B1
(45) Date of Patent: Jul. 29, 2025

(54) METHOD FOR OPERATING CLUTCH ELEMENTS OF A TRANSMISSION

(71) Applicant: Sigma Powertrain, Inc., Livonia, MI (US)

(72) Inventors: Daniel E Knieper, Clarkston, MI (US); Graham Scott Russell, Clarkston, MI (US); R William Davis, Orion, MI (US); John W Kimes, Clermont, FL (US)

(73) Assignee: Sigma Powertain, Inc., Livonia, MI (US)

( * ) Notice: Subject to any disclaimer, the term of this patent is extended or adjusted under 35 U.S.C. 154(b) by 154 days.

(21) Appl. No.: 18/458,992

(22) Filed: Aug. 30, 2023

Related U.S. Application Data

(60) Provisional application No. 63/402,434, filed on Aug. 30, 2022.

(51) Int. Cl.
 *F16D 48/06* (2006.01)
 *F16D 41/12* (2006.01)
(52) U.S. Cl.
 CPC .............. *F16D 48/06* (2013.01); *F16D 41/12* (2013.01); *F16D 2500/10412* (2013.01); *F16D 2500/10493* (2013.01)

(58) Field of Classification Search
 CPC ........... F16D 41/12; F16D 2500/10412; F16D 2500/10493; F16D 2500/3023; F16D 2500/30401
 See application file for complete search history.

(56) References Cited

U.S. PATENT DOCUMENTS

| | | | |
|---|---|---|---|
| 6,615,965 B2 * | 9/2003 | Fitz ....................... | F16D 41/125 192/106 R |
| 9,677,626 B2 * | 6/2017 | Tomita ..................... | F16D 41/14 |
| 11,739,801 B2 * | 8/2023 | Thomas .................. | F16D 41/14 192/30 R |
| 12,117,049 B2 * | 10/2024 | Viola ...................... | G01D 5/142 |

* cited by examiner

*Primary Examiner* — Huan Le
(74) *Attorney, Agent, or Firm* — Simonelli IP, PLLC

(57) ABSTRACT

A method calculates a time for which a force is to be applied to a strut to have the strut lockingly engage a notch of a notch plate. The notch plate has a plurality of notches equidistantly spaced about a surface of the notch plate at a predetermined distance from each other. The method begins by measuring a rotational speed of the notch plate. The method then identifies the predetermined distance between the notches in the notch plate. The predetermined distance is divided by the measured speed to create a positioning time. A pivot time is added to the positioning time allow the strut to travel along the notch plate and into the notch a sufficient distance to physically lock the pocket plate and the notch plate together.

5 Claims, 10 Drawing Sheets

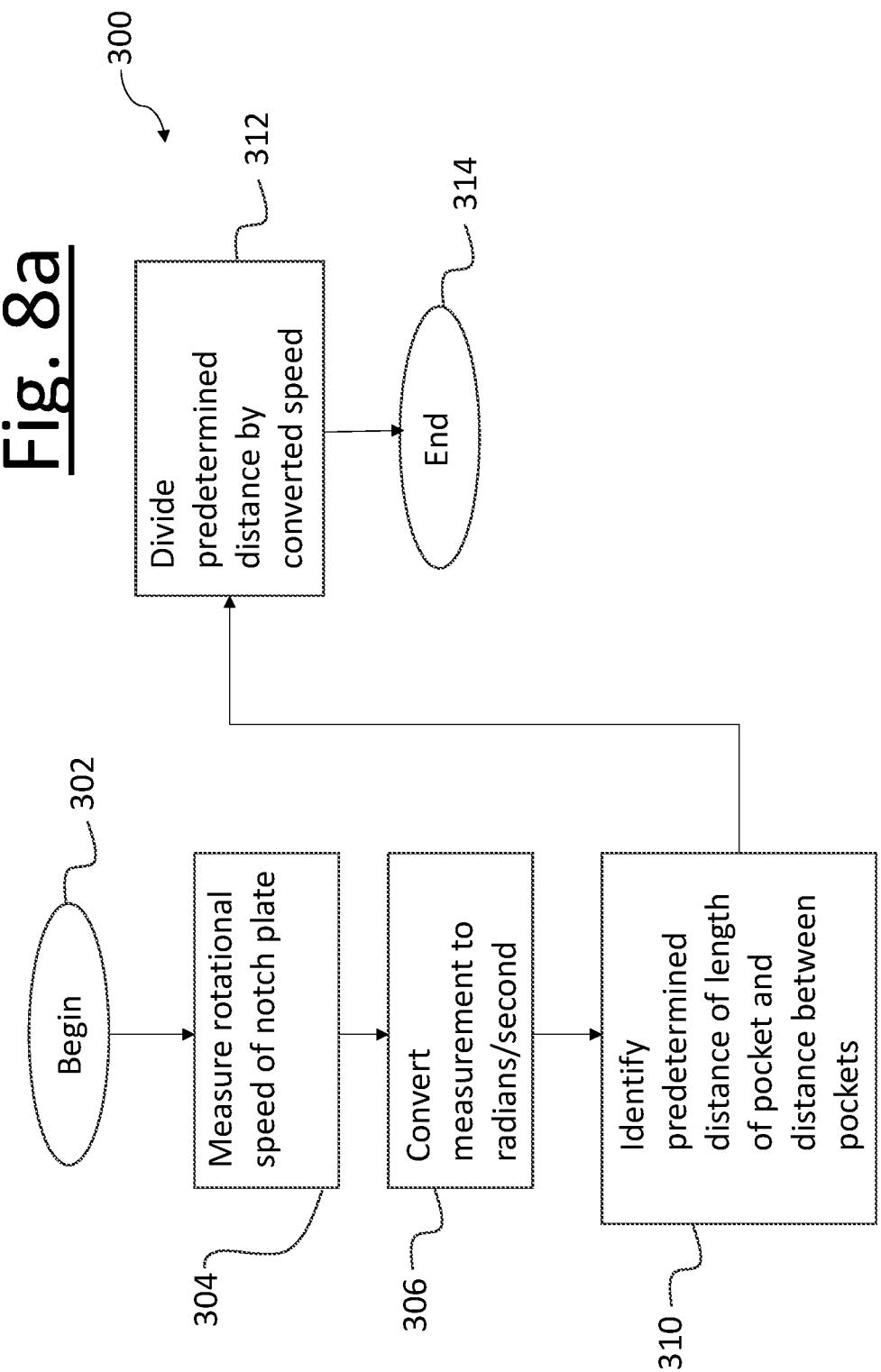

METHOD FOR OPERATING CLUTCH ELEMENTS OF A TRANSMISSION

BACKGROUND ART

1. Field of the Invention

The invention relates to a method for shifting between two gears of a transmission. More particularly, the invention relates to a method for releasing a clutch having digital coupling components.

2. Description of the Related Art

Transmissions in vehicles are used to control rotational torque to move the vehicle effectively and as efficiently as possible. Traditionally, transmissions employ hydraulic or pneumatic clutches (hydraulic clutches) to change gear ratios. Hydraulic clutches are, however, very inefficient in that much of the energy used to operate the hydraulic clutches is converted into thermal energy, much of which is dissipated into the atmosphere. In addition, hydraulic clutches require constant pressure to remain engaged, which further expends energy. This waste of energy is not acceptable in vehicles that use batteries as a primary energy source to create the motive force of the vehicle.

Digital clutches can be used to vastly reduce the amount of energy used during a change in gears of a transmission. Control of these digital clutches in the transmission are paramount to the proper function of the transmission. If a digital clutch does not transition properly, it could damage the transmission.

SUMMARY OF THE INVENTION

A method calculates a time for which a force is to be applied to a strut to have the strut lockingly engage a notch of a notch plate. The notch plate has a plurality of notches equidistantly spaced about a surface of the notch plate at a predetermined distance from each other. The method begins by measuring a rotational speed of the notch plate. The method then identifies the predetermined distance between the notches in the notch plate. The predetermined distance is divided by the measured speed to create a positioning time. A pivot time is added to the positioning time allow the strut to travel along the notch plate and into the notch a sufficient distance to physically lock the pocket plate and the notch plate together.

BRIEF DESCRIPTION OF THE DRAWINGS

Advantages of the invention will be readily appreciated as the same becomes better understood by reference to the following detailed description when considered in connection with the accompanying drawings, wherein:

FIGS. 8a and 8b are alternative methods for engaging struts of a clutch; and

DETAILED DESCRIPTION OF THE DRAWINGS

Figure 1A:
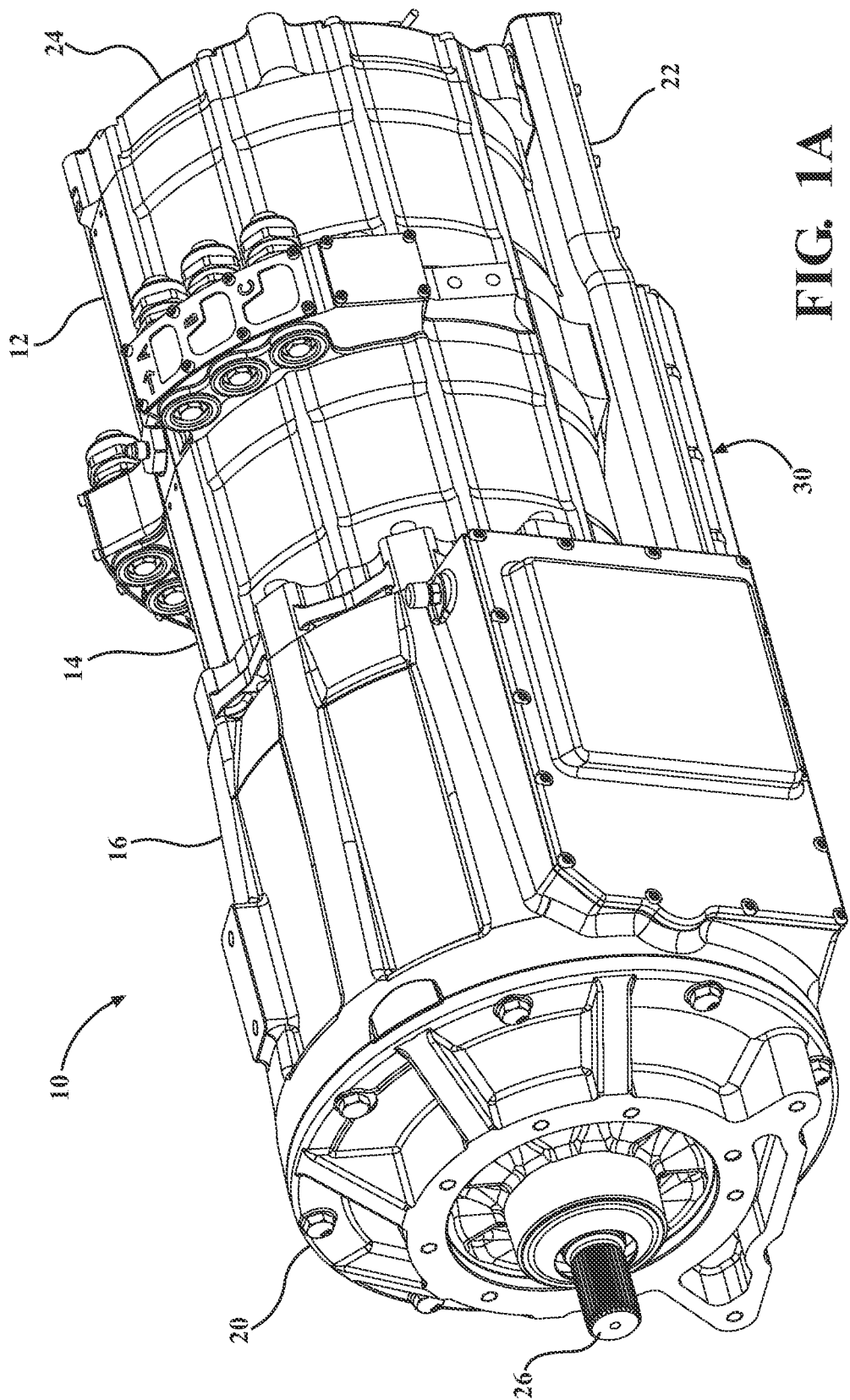
FIG. 1A is a perspective view of one embodiment of a vehicular powertrain.

For purposes of this discussion, elements will be identified by reference characters, typically reference numerals. There are a few embodiments shown in the Figures that will be described in detail below. For purposes of simplicity, these elements will retain their reference characters throughout the discussion. If an element has characteristics that are different from one embodiment to another, those differences will be discussed when introducing the same element for the new embodiment.

Referring to FIG. 1A, a perspective view of one embodiment of a transmission is generally shown at 10. In this Figure, the transmission 10 is operatively connected to a first motor 12 and a second motor 14. Physically, the second motor 14 is mounted to the transmission 10 between the transmission 10 and the first motor 12. The first motor 12 has an output (discussed subsequently) that extends through the second motor 14 and to the transmission 10.

Figure 1B:
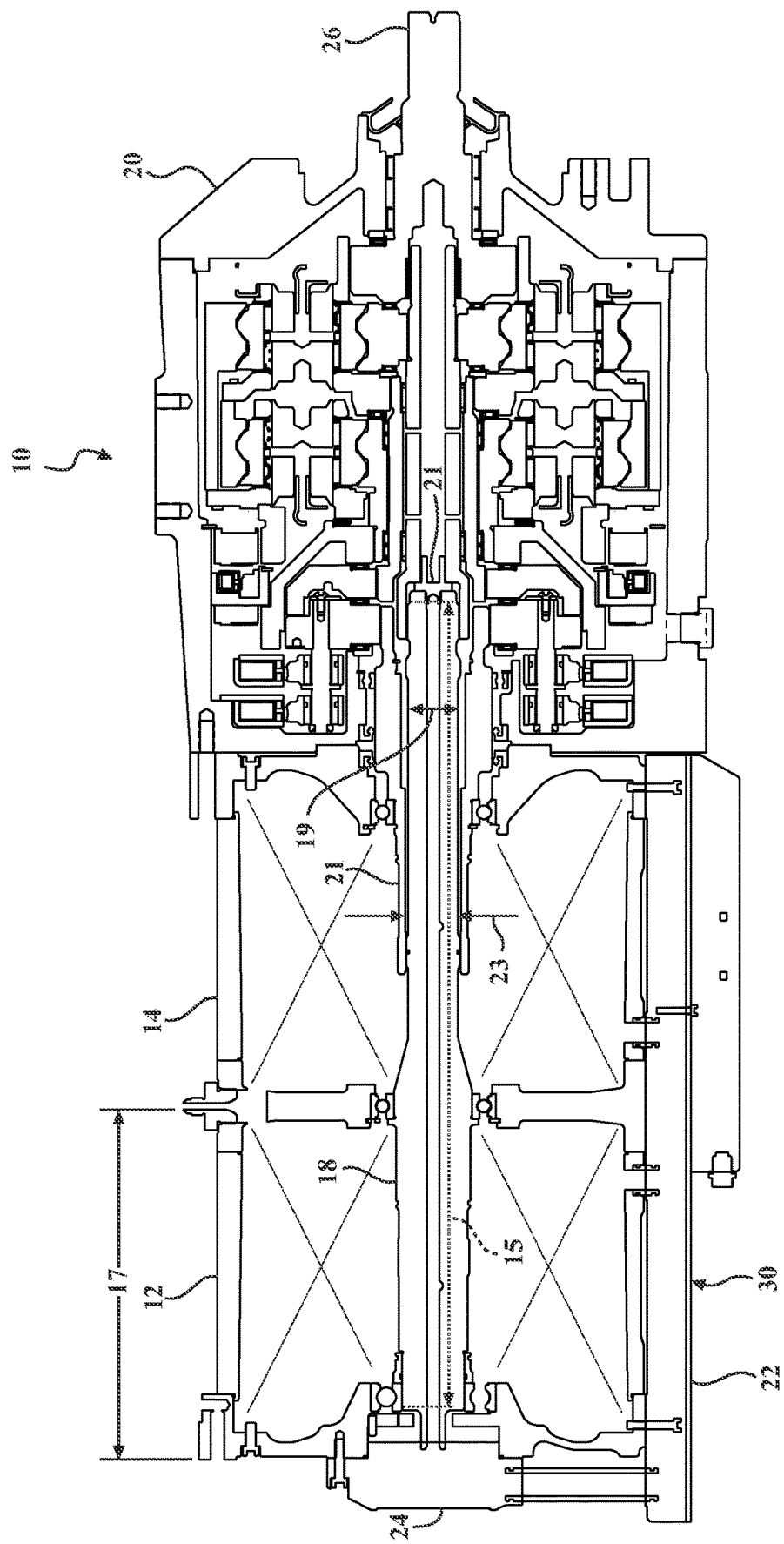
FIG. 1B is a schematic drawing of a cross-section of the embodiment shown in FIG. 1A.

The transmission 10 includes a transmission housing 16 having a housing cap 20. FIGS. 1A and 1B show the second motor 14 (B-Motor) secured to the transmission housing 16 and the first motor 12 (A-Motor) secured to the second motor 14 (B-Motor). A first motor output shaft 18 of the first motor 12 (A-Motor) defines a length 15 that is longer than a length 17 of the first motor 12. The first motor output shaft 18 also defines an outer diameter 19 at its distal end 21.

The second motor 14 (B-Motor) includes a second motor output shaft 21. The second motor output shaft 21 defines an inner diameter 23 that is larger than the outer diameter 19 of the first motor output shaft 18. The first motor output shaft 18 extends through and is coaxial with the second motor output shaft 21. It should be appreciated by those skilled in the art that the first motor output shaft 18 may not extend all the way through the second motor output shaft 21.

In alternative embodiments that will be discussed in greater detail below, the first 12 and second 14 motors may be mounted on either side of the transmission 10. Oil used to cool the transmission 10, the first motor 12 and the second motor 14 is collected by a catch basin 22 and recirculated using a pump 24, which is in fluid communication with the catch basin 22. Because the catch basin 22 extends along the entire length of the transmission 10, the first motor 12 and the second motor 14, only one pump 24 is necessary. The transmission 10 has an output shaft 26 that extends out through the center of the housing cap 20. Electrical ports (not shown) provide electrical access inside the first 12 and second 14 motors. The transmission 10, first motor 12, second motor 14, and pump 24 may be referred to as a powertrain, generally shown at 30.

Figure 2:
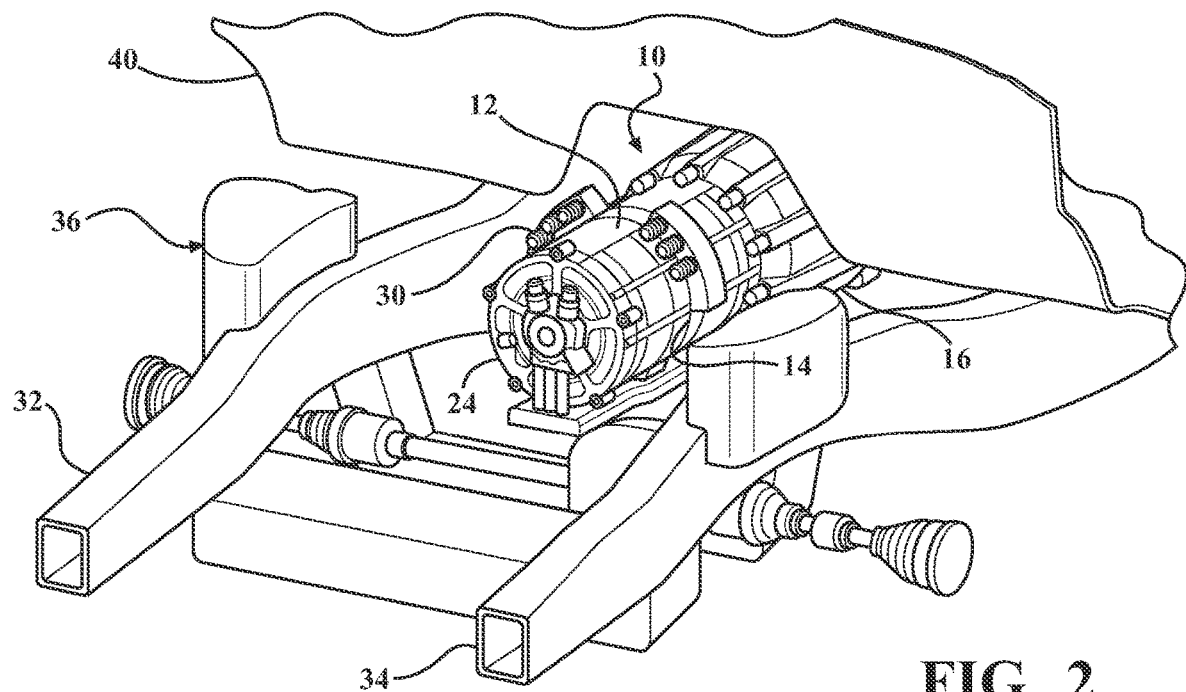
FIG. 2 is a perspective view of the powertrain embodiment shown in FIGS. 1A and 1B mounted to a vehicle.
Figure 3:
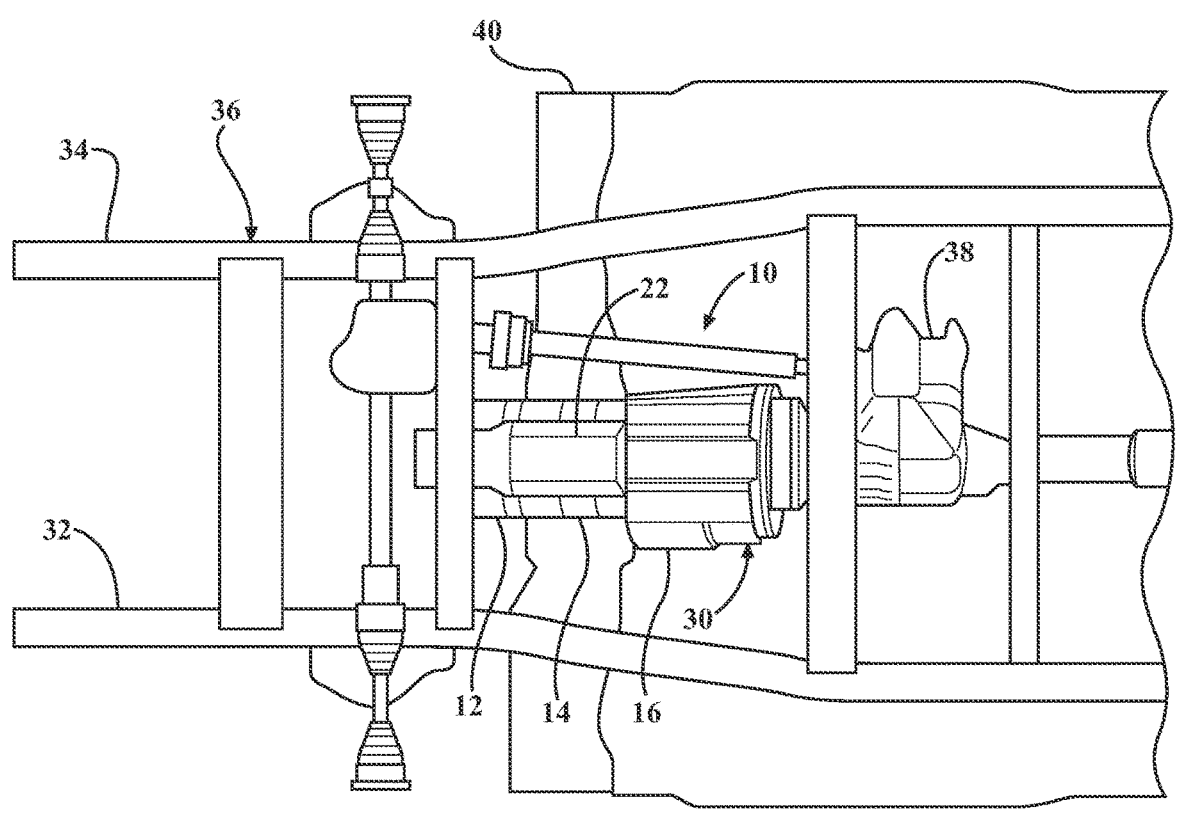
FIG. 3 is a bottom view of a vehicle with the powertrain embodiment shown in FIGS. 1A and 1B mounted thereto.

Referring to FIGS. 2 and 3, the powertrain 30 is shown mounted between two rails 32, 34 of a vehicular frame, generally shown at 36. A body 40, including a passenger compartment (not shown), is shown fixedly secured to the vehicular frame 36. Referring specifically to FIG. 3, the transmission 10 is shown connected to a drive line 38 that drives four wheels (none shown).

Figure 4:
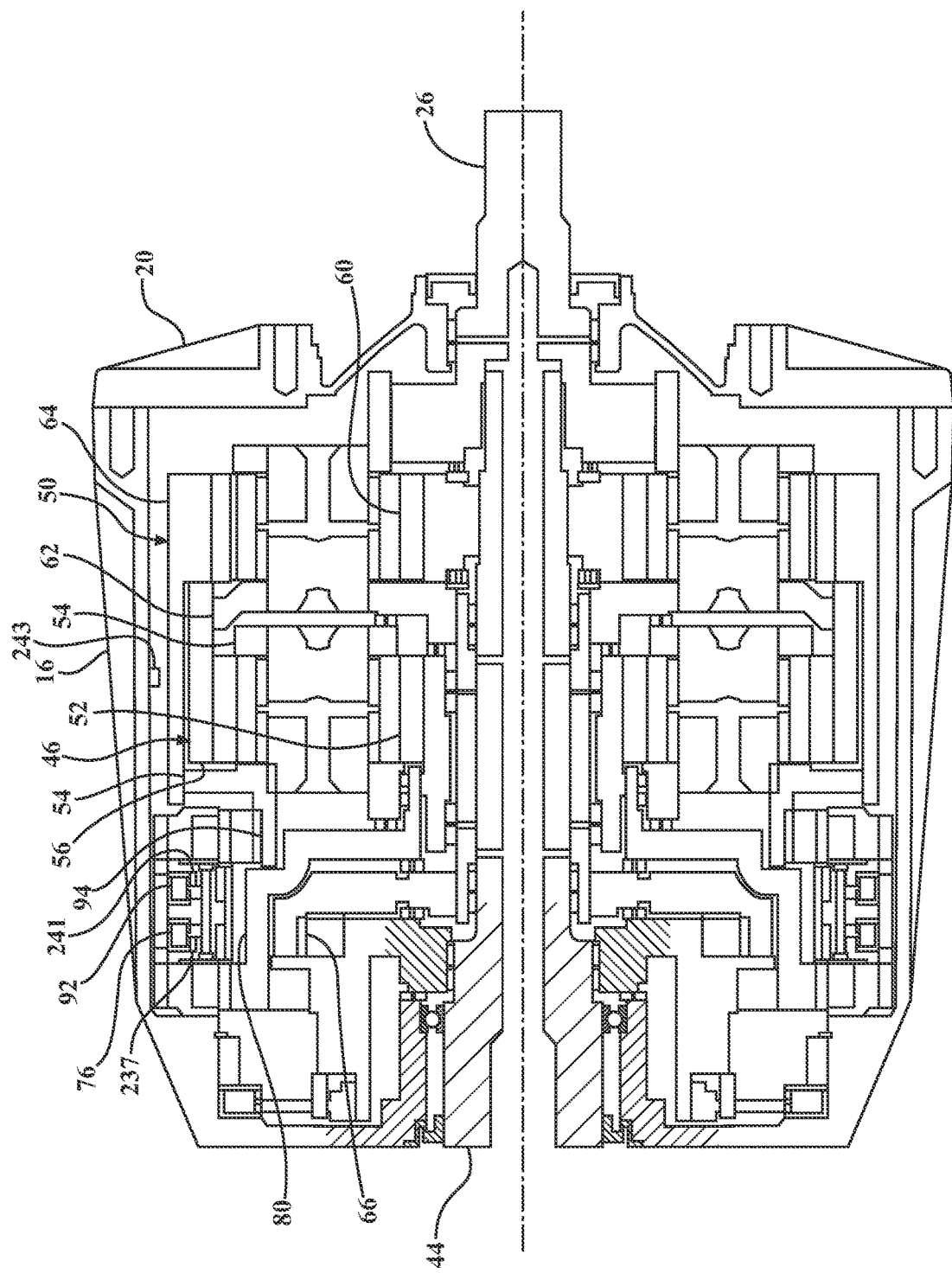
FIG. 4 is a cross-sectional side view of a transmission having one input.
Figure 5:
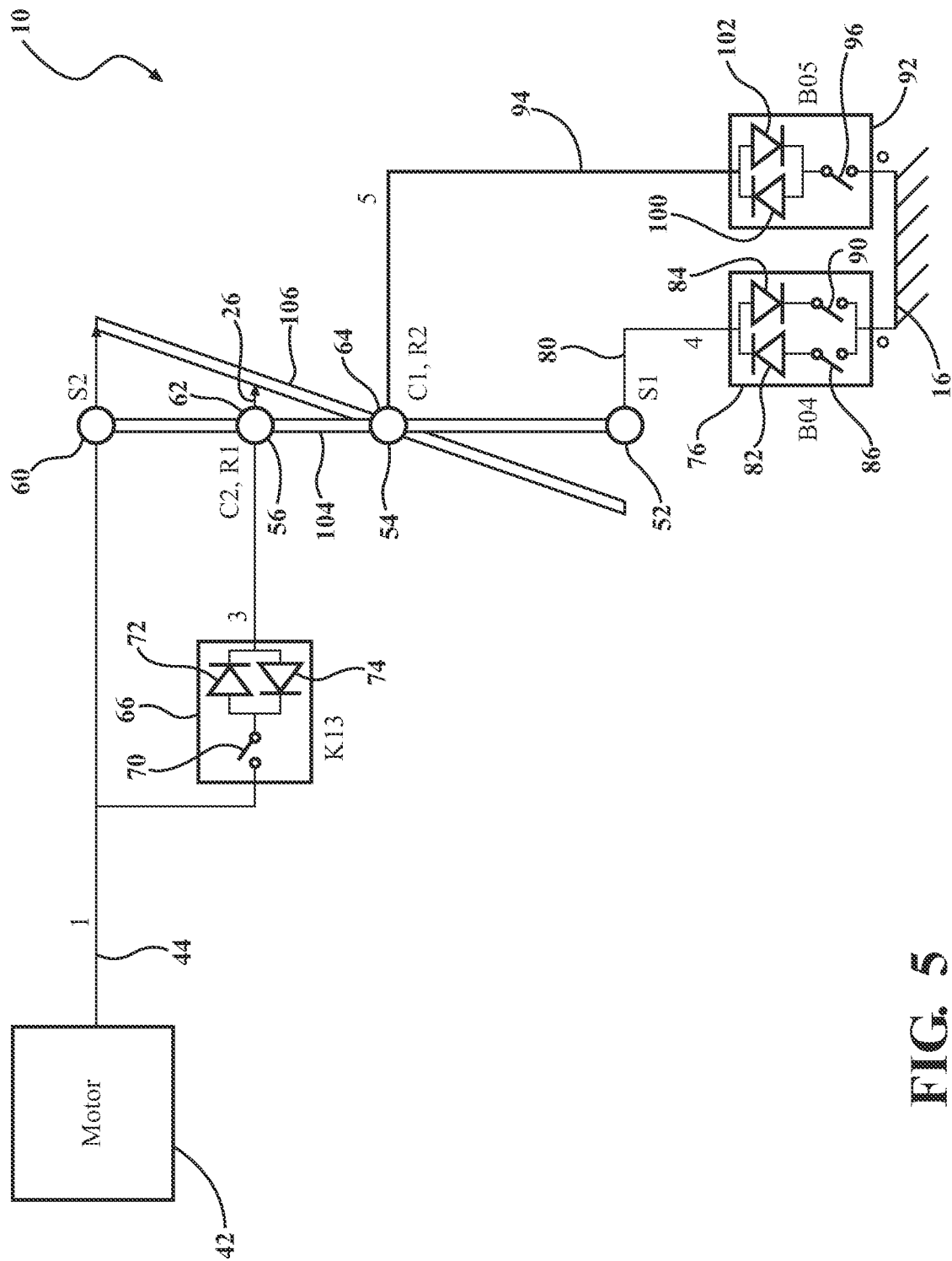
FIG. 5 is a lever diagram of one embodiment of a transmission having one embodiment.

Referring to FIGS. 4 and 5, the transmission 10 is shown in a configuration for operating with a single input. In this configuration, the single input is the first motor 12 fixedly secured directly to the transmission housing 16 in the absence of the second motor 14. The first motor 12 is not shown in FIG. 4, but the first motor output shaft 18 would be received the input shaft 44.

The input shaft 44 is also designated as shaft "1" in the power flow shown in FIG. 5. The transmission 10 also includes a first gearset, generally shown at 46, and a second gearset, generally shown at 50. The first gearset 46 includes first 52, second 54 and third 56 rotating members. The second gearset 50 includes a fourth 60, fifth 62, and sixth 64 rotating members. These gearsets 46, 50 may be any gearset that has three rotating members. Types of gearsets contemplated include, but are not limited to, Ravigneaux gearsets, Simpson gearsets and ring-carrier/ring-carrier gearsets. The gearsets 46, 50 shown in FIGS. 4 and 5 are ring-carrier/ring-carrier gearsets. Because these gearsets 46, 50 are ring-carrier/ring-carrier gearsets, the first 52, second 54 and third 56 rotating members are a sun gear, a carrier, and a ring gear, respectively. These are indicated as S1, C1, and R1 for the first gearset 46 and S2, C2, and R2 for the second gearset 50. Two rotating members from the first gearset 46 and two rotating members from the second gearset 50 are fixedly secured to each other. These connections create a four-node linkage for the transmission 10. As such, each pair of rotating members is represented by a single circle in FIG. 5. Therefore, the first rotating member 56 (ring gear R1) and the fifth rotating member 62 (carrier C2) are fixedly secured to each other and represented by both reference numerals 56 and 62 in FIG. 5, whereas the second rotating member 54 (carrier C1) and the sixth rotating member 64 (ring gear R2) are fixedly secured to each other and represented by both reference numerals 54 and 64 in FIG. 5.

The output shaft 26 of the transmission 10 is also fixedly secured to two rotating members, one from each gearset 46, 50. In the embodiment shown in FIGS. 4 and 5, the output shaft 26 is fixedly secured to the third rotating member 56 (the ring gear R1 of the first gearset 46 and the fifth rotating member 62 of the second gearset 50 (the carrier C2 of the second gearset 50). The motor 12 is connected directly to the fourth rotating member 60 of the second gearset 50 using the input shaft 44 (shaft 1).

A controllable clutch 66 is connected between the input shaft 44 (shaft 1) at one end and the output shaft 26 (shaft 3) at the other end. The controllable clutch 66 is also represented by the nomenclature K13 because it couples shafts 1 and 3 together. Referring specifically to FIG. 5, the controllable clutch 66 is represented by a switch 70 and two diodes 72, 74. These three elements 70, 72, 74 represent the attributes of the controllable clutch 66. More specifically, the switch 70 signifies that the controllable clutch 66 may be turned on and off. The diodes 72, 74 represent the fact that the controllable clutch 66 will the third rotating member 56 (ring gear R1), the fifth rotating member 62 (second carrier C2) and the output shaft 26 (shaft 3) to lock in both directions, or to rotate freely in both directions. Therefore, when the switch 70 is closed, representing the active state for the controllable clutch 66, the output shaft 26 rotates with the rotation of the input shaft 44. When the switch 70 is open, representing an inactive state for the controllable clutch 66, the output shaft 26 does not rotate or, alternatively, rotates based on the torques it receives from the other rotating elements 52, 54, 60, 64 of the first 46 and second 50 gearsets.

The transmission 10 also includes a first controllable brake 76 (B04) that couples the first rotating member 52 (sun gear S1) of the first gearset 46 to the transmission housing 16. The first controllable brake 76 also has the symbol B04 because it is a brake that connects shaft 0 (which is just the transmission housing 16) with a fourth shaft 80 (shaft 4). The first controllable brake 76 (B04) is similar to the controllable clutch 66 in that it is represented by two diodes 82, 84 representing that it will lock and allow rotation in either direction. The first controllable brake 76 (B04) is different from the controllable clutch 66 in that each direction of operation can be controlled independently of the other, as represented by switches 86, 90. Operation of the first controllable brake 76 will be discussed in greater detail subsequently.

This transmission 10 also includes a second controllable brake 92 (B05) which couples the second rotating member 54 (carrier C1) of the first gearset 46 and the sixth rotating member 64 (ring R2) of the second gearset 50 to the transmission housing 16. The second controllable brake 92 differs from the first controllable brake 76 in that it only has the ability to control whether a notch plate 94 (shaft 5) is rotating or if it is tied to the transmission housing 16 and prevented from rotating. As such, the second controllable brake 92 only includes a single switch 96 representing the two states of the second controllable clutch 92 (B05) as being either on or off, and two diodes 100, 102 indicate that the second controllable brake 92 (B05) can lock or allow the notch plate 94 (shaft 5) rotate in either direction.

Figure 6:
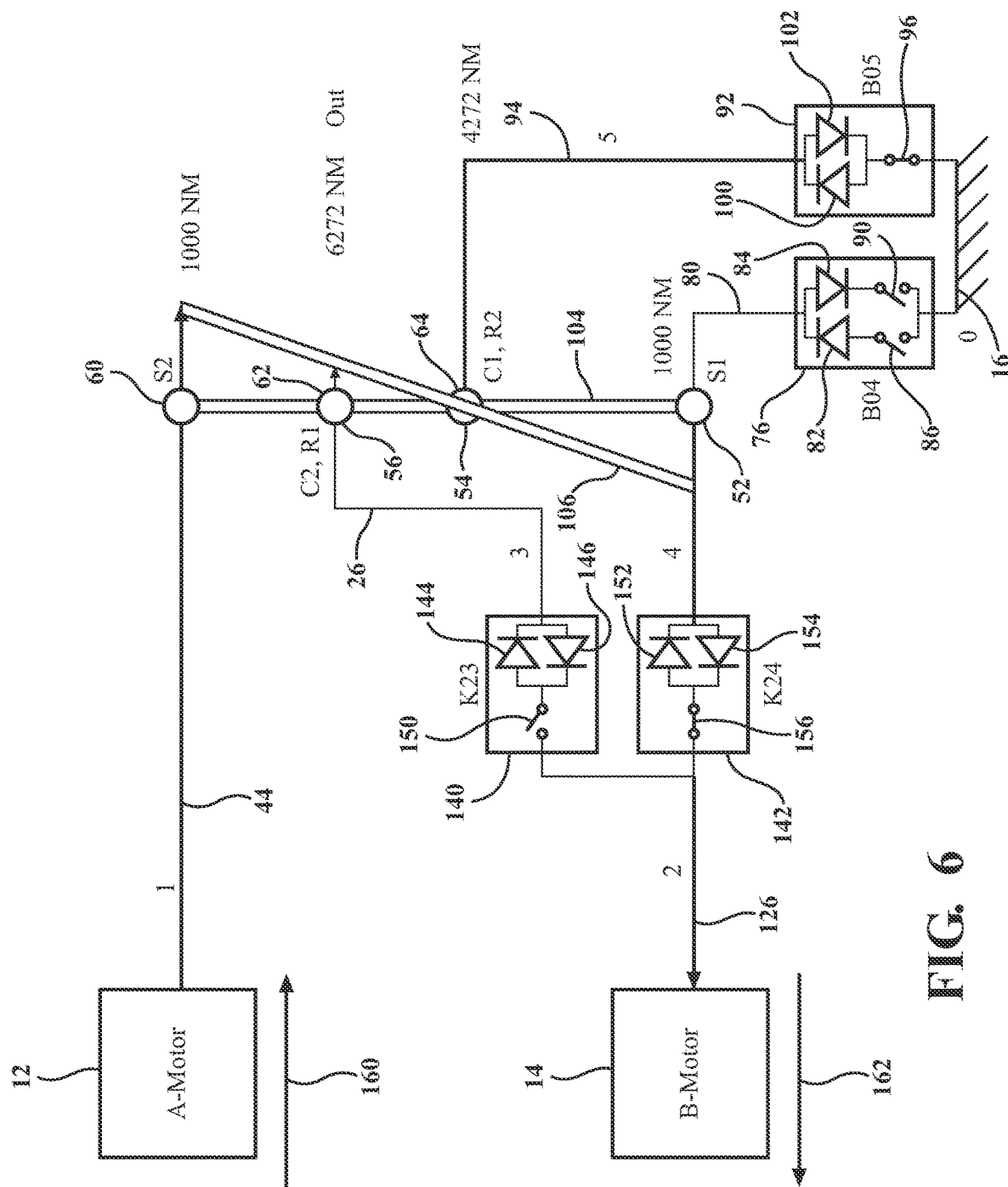
FIG. 6 is a lever diagram of one embodiment of a transmission having two inputs.

Referring to FIG. 6, a lever diagram showing the transmission 10 having two inputs (FIGS. 1A and 1B) is shown. The lever diagram is substantially similar to lever diagram for the single-input transmission shown in FIG. 5. One difference between the two configurations is the transmission 10 has two input shafts 44, 126, wherein the first input shaft 44 receives torque from the first motor 12 (A-Motor) and the second input shaft 126 receives torque from the second motor 14 (B-Motor). Another difference between the two configurations is the use of two controllable clutches 140 (K23), 142 (K24) instead of the single controllable clutch 66 (K13).

The output of the first motor 12 (A-Motor) is received by the first input shaft 44 (shaft 1), which is fixedly secured to the fourth rotating member 60 (sun gear S2) of the second gearset 50. The output of the second motor 14 (B-Motor) is received by the second input shaft 126 (shaft 2). The second input shaft 126 (shaft 2) is connected to the first controllable clutch 140 (K23) and the second controllable clutch 142 (K24). The first controllable clutch 140 (K23) operates in both directions as is indicated by the diodes 144, 146, which are oriented in opposite directions. A switch 150 illustrates that the clutch 140 (K23) is controllable and may be locked or allowed to rotate in both directions. The second controllable clutch 142 (K24) operates in both directions, as is indicated by the diodes 152, 154, which are oriented in opposite directions. A switch 156 illustrates that the controllable clutch 142 (K24) is controllable and may be locked or allowed to rotate in both directions.

The first controllable clutch 140 (K23) couples the second input shaft 126 (shaft 2) and the output shaft 26 (shaft 3). The second controllable clutch 142 (K24) couples the second input shaft 126 (shaft 2) with the fourth shaft 80 (shaft 4). As discussed above, the output shaft 26 is fixedly secured to both the third rotating member 56 (ring R1) of the first gearset 46 and the fifth rotating member 62 (carrier C2) of the second gearset 50.

The transmission 10 also includes a first controllable brake 76 (B04) that couples the first rotating member 52 (sun gear S1) of the first gearset 46 to the transmission housing 16. The first controllable brake 76 also has the symbol B04 because it is a brake that connects the transmission housing 16 (shaft 0) with a fourth shaft 80 (shaft 4). The first controllable brake 76 is similar to the controllable clutches 140, 142 in that it is represented by two diodes 82, 84 representing operation in either direction. The first controllable brake 76 is different from the controllable clutches 140, 142 in that each direction of operation can be controlled independently of the other, as represented by the two switches 86, 90. Operation of the first controllable brake 76 will be discussed in greater detail subsequently.

This transmission 10 also includes a second controllable brake 92 (B05) which couples the second rotating member 54 (carrier C1) of the first gearset 46 and the sixth rotating member 64 (ring R2) of the second gearset 50 to the transmission housing 16. The second controllable brake 92 differs from the first controllable brake 76 in that it only can control whether a notch plate 94 (shaft 5) is rotating, or if it is tied to the transmission housing 16 and prevented from rotating. As such, the second controllable brake 92 only includes a single switch 96 representing the two states of the second controllable clutch 92 (B05) as being either on or off, and two diodes 100, 102 indicate that the second controllable brake 92 (B05) can lock in both directions or it can move freely in both directions.

Because the first 46 and second 50 gearsets are ring-carrier/ring-carrier gearsets, the connections described in the power flow in FIG. 5, and the first 18 and second 19 motor output shafts are coaxial, the second motor 14 (B-Motor) is able to drive the output shaft 26 (shaft 3) directly. The number of modes of operation increase due to this capability. In the embodiments shown in the Figures, the first motor output shaft 18 extends through the second motor output shaft 19. As such, the second motor output shaft 19 is hollow providing a space through which the first motor output shaft 18 extends.

In FIG. 6, the steady-state lever 104 represent when the host vehicle is not in motion. The operational lever 106 represents when the vehicle is moving through the operation of the first motor 12 (A Motor) and/or the second motor 14 (B Motor). The first controllable clutch 140 (K23) is open as represented by the switch 150 being open. In addition, the second controllable clutch 142 (K24) is closed. Therefore, the second motor 14 (B Motor) is coupled to the first rotating member 52 (sun gear S1) of the first gearset 46. The first rotating member 52 (sun gear S1) is not grounded to the transmission housing 16 because the first controllable brake 76 (B04) is open. Finally, the second controllable brake 92 (B05) is closed tying the second rotating member 54 (carrier C1) of the first gearset 46 and the sixth rotating member 64 (ring gear R2) of the second gearset 50 are ground to the transmission housing 16 through the notch plat 94 (shaft 5).

In this configuration, the first motor 12 is operating in the forward direction, indicated by arrow 160, and the second motor 14 is operating in the reverse direction, indicated by arrow 162. By way of example, and in not to be limiting, exemplary torques are provided based on the designs of the gearsets 46, 50 and the motors 12, 14. Given the output of the first motor 12 (A Motor) provides a torque of 1000 NM on the second sun gear 60 (sun gear S2) and the output of the second motor 14 provides a torque of 1000 NM in the opposite direction on the first rotating member 52 (sun gear S1) results in a torque of 4272 NM on the second rotating member 54 (carrier C1) of the first gearset 46 and the sixth rotating member 64 (ring gear R2) of the second gearset 50 and an output torque of 6272 NM at the output shaft 26. This is "first gear." The transmission 10 is more fully described in U.S. Pat. No. 10,711,867, which is co-owned by Applicant, and the disclosure therein is expressly incorporated herein by reference.

Figure 7:
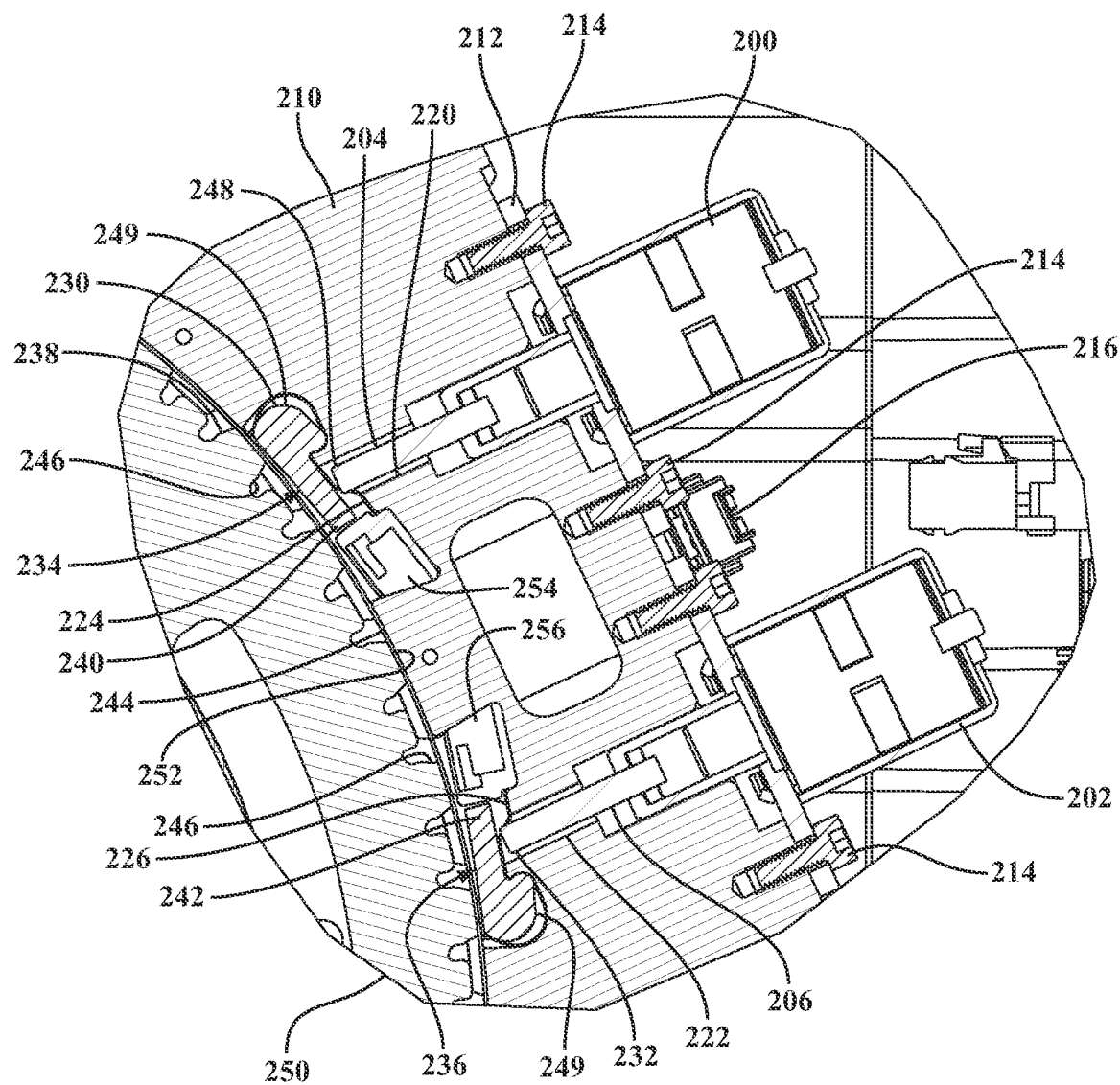
FIG. 7 is a cross-sectional side view, partially cut away, of first and second directional struts used to control elements of a clutch in their respective extended positions.

Referring to FIGS. 7, clutch elements used to facilitate the shifting of the transmission 10 are shown. The clutch elements may be used for either brake clutches or controllable clutches. In the embodiment shown, the clutch elements are a part of the first controllable brake 76 (B04). It should be appreciated by those skilled in the art that these clutch elements could be used with any of the independently controllable clutches used in this transmission 10.

The clutch elements shown include first 200 and second 202 actuators. In the embodiment shown, the first 200 and second 202 actuators are solenoids, each having a plunger 204, 206, respectively. The actuators 200, 202 are fixedly secured to a pocket plate 210 using a mounting plate 212 and a plurality of bolts 214. Electrical power to and control of the two actuators 200, 202 come through a communications module as represented by a wire harness connector 216 as is known in the art. The plungers 204, 206 extend through channels 220, 222, respectively, in the pocket plate 210 and into first 224 and second 226 pockets disposed adjacent to an inner diameter (244) of the pocket plate 210. The channels 220, 222 allow the plungers 204, 206 to move axially between respective retracted positions (FIG. 7) and extended positions (FIG. 10) wherein distal ends 230, 232 of the plungers 204, 206 extend into the pockets 224, 226 of the pocket plate 210. The plungers 204, 206 and channels 220, 222 are linear and the plungers 204, 206 move back and forth along the channels 220, 222, but they 204, 206, 220, 222 may or may not be radial extensions of the notch plate 250.

In each of the first 224 and second 226 pockets are first 234 and second 236 directional struts. The struts 234, 236 reside in the pockets 224, 226. In their retracted positions, biased by springs (not shown), the struts 234, 236 are completely within their respective pockets 224, 226. When the struts 234, 236 pivot, an engagement portion 240, 242 of the struts 234, 236 move out beyond the pockets 224, 226 past a pocket plate inner diameter 244 and into notches 246 of a notch plate 250 having an outer diameter 252 slightly smaller than the pocket plate inner diameter 244. More specifically, the engagement portions 240, 242 of the struts 234, 236 engage respective notch walls 238, 239 of the notches 246. Position modules 254, 256 identify the position of the struts 234, 236. Examples of position sensors are described in US patent application owned by Applicant, having Ser. No. 17/495,062, the specification of which is hereby incorporated by reference. It should be appreciated by those skilled in the art that a clutch may include a plurality of these actuator/strut pairs and only a pair of these actuator/strut assemblies are shown in the FIGURES for purposes of simplicity.

Applying Clutches Elements

While continuing with the example clutch shown in FIG. 7, there is a need to apply the first 200 and second 202 clutch elements long enough to allow the struts 234, 236 to pivot into one of the notches 246 of the notch plate 250. When applying a clutch without compliance built into in the struts or strut activation system, the struts will only engage if they are aligned with the notches 246 in the notch plate 250 while being forced on. If the force is applied while the strut 234, 236 is aligned with the space between the notches 246, when the force is removed, the clutch will not latch to the on position and instead will return to the latched off position. Said another way, the struts 234, 236 need to be pivoted toward the notch plate 250 long enough that they will have the opportunity to pivot into one of the notches 250.

To ensure this occurs, one of two methods, generally shown at 300 in FIG. 8a begins at 302. The rotational speed of the notch plate 250 is measured at 304. The rotational speed is converted to radians/second at 306.

A predetermined distance is identified at 310. The predetermined distance is the length of the notch 246 combined with the distance between notches 246, commonly referred to as "land." In theory, a force need only be applied long enough for the strut to travel along the land and into the notch 246 in order for the strut 234, 236 to engage the notch 246. In one example, this is simply 360 degrees divided by the number of notches 246. The predetermined distance is divided by the converted speed measurement at 312. This quotient of the predetermined distance divided by the converted speed measurement is called the positioning time. The method 300 ends at 314.

Figure 8B:
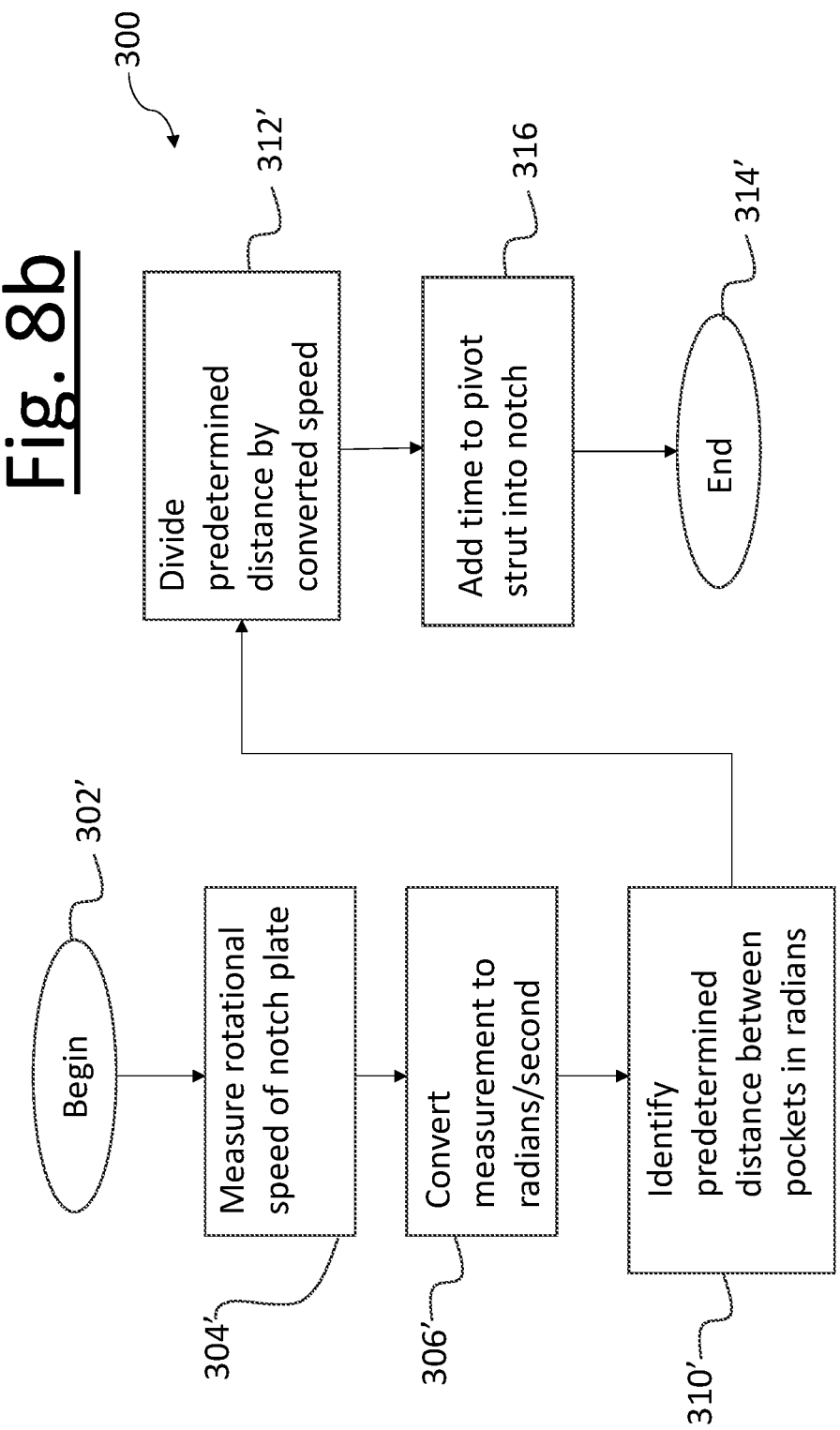

An alternative method is shown in FIG. 8b, wherein like primed reference numerals represent similar steps as those described above and shown in FIG. 8a. The difference between the method 300 above and this method 300' is how the overall time for actuation engagement of the strut 234, 236 is calculated. In this method 300', the predetermined distance is only the land, i.e., the space between notches 246. That distance is divided by the converted speed at 312' to create a positioning time. The positioning time is the maximum time it takes for the distal end 230, 232 of the strut 234, 236 (either strut 234, 236 can be used because it does not matter the direction of movement) to move along the notch plate 250 until it aligns with a notch 246. It could occur in less time, but it will occur at least by the maximum positioning time as calculated.

Once the strut 234, 236 is in position, it needs to pivot its distal end 230, 232 into the notch 246. Since the strut 234, 236 is not a point, but a physical device, the time must be increased so that the clutch actuator 200, 202 can apply a force long to allow the strut 234, 236 to pivot far enough to latch. Therefore, a pivot time is added to the positioning time at 316. By applying a force from the clutch actuators 200, 202 for the time period defined by the pivot time added to the positioning time, the strut 234, 236 will have a force applied to it for a sufficient amount of time to move into position and pivot into a notch 246. The method 300' ends at 314'.

Releasing Clutches

When releasing the clutch 76, it is important to ensure that both sides (forward and coast) are released and in the off position before significant change of torque or speed occurs between the pocket plate 210 and notch plate 246 of the clutch 76.

To ensure that the clutch 76 is released there is a process for releasing the clutch 76 which is then followed by a process to check that the clutch 76 has been disengaged before moving to the next step of a shift.

Figure 9:
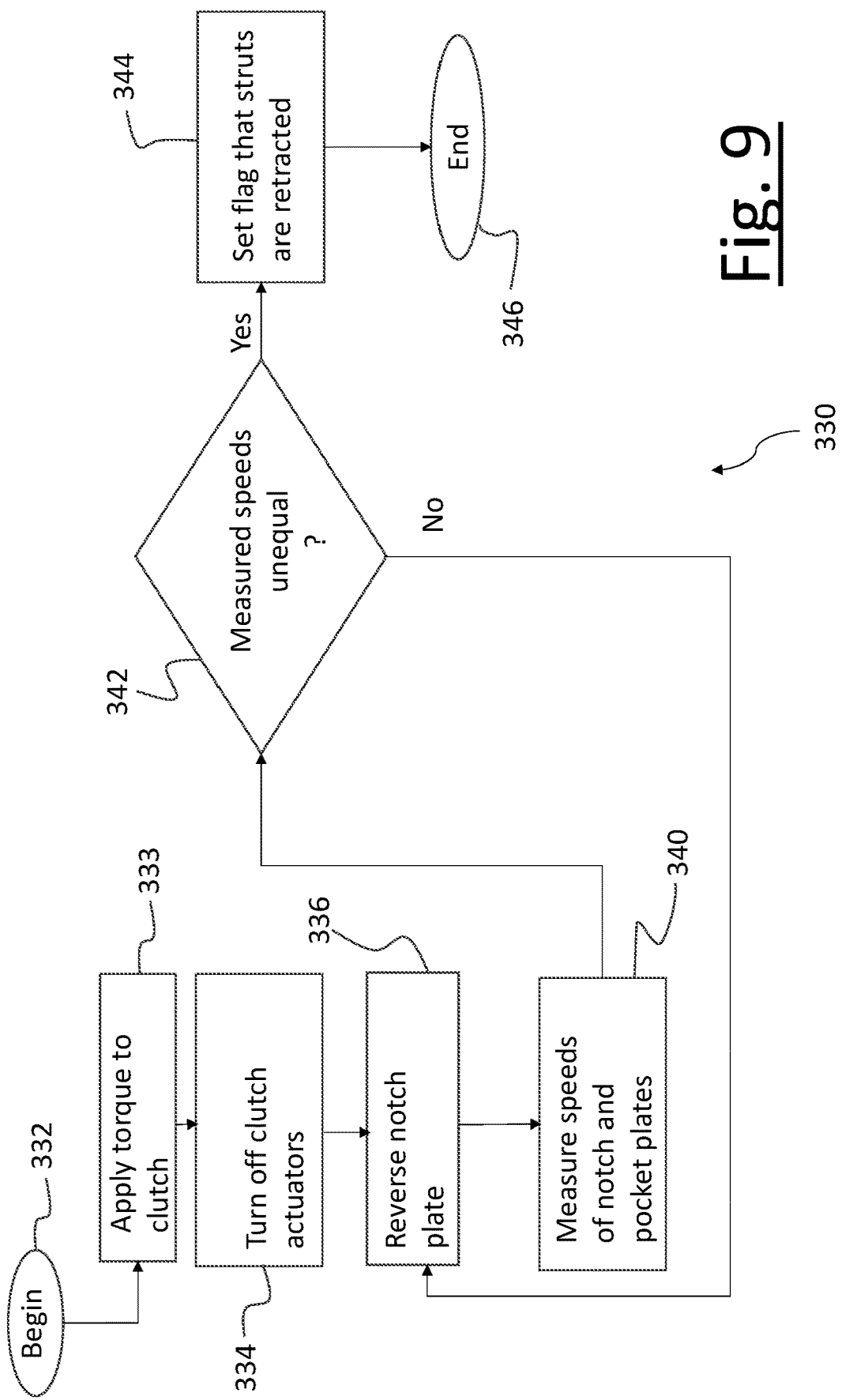
FIG. 9 is a method to disengage struts of a clutch.

The method is generally shown at 330 in FIG. 9 and begins at 332. The method 330 turns the clutch actuators 200 off at 334. The method 330 uses the second motor 14 (FIG. 6) to apply torque across the clutch 76 to ensure that the clutch 76 is engaged and carrying torque in one of two possible directions at 336. This ensures the struts 234 in the first direction are engaged fully and the struts 236 in the other direction (second direction) are not in contact with the notch plate 250 (step 333). With the torque holding the notch plate 250 against the struts 234 in the first direction, the second motor 14 for the clutch 76 is turned off allowing the second struts 236 in the second direction to turn off. At this point the struts 234 in the first direction are held in the on position by the notch plate 250, but will be free to turn off and retract once the notch plate 250 is no longer holding them. Once the second motor 14 is done turning off the torque direction is then reversed at 336 to rotate the notch plate 250 in the second direction. This allows the struts 234 to move to the off position because the notch plate 250 released the struts 234. The loading of the struts 236 in the opposite direction is to allow the quick rotation in the desired direction as soon as all the struts 236 are released.

Some struts 234 may be non-compliant. Position sensors can be used to check that the struts 234 are disengaged. Other struts 234 do not have position sensors and must use an alternate method of confirming that the strut 234 is disengaged or turned off.

The method 330 assists in determining whether struts 234 are non-compliant without the aid of position sensors by moving the notch plate 250 by applying a torque in a pattern which changes the direction of the torque to attempt to produce a speed differential between the notch plate 250 and the pocket plate 210. During the time when the torque profile is being applied, speed sensors are used to measure the speed of the pocket plate 210 and the notch plate 250 at 340. The method 330 determines at 342 whether the rotational speeds of the pocket 210 and notch 250 plates are different. If not, the method 330 loops back and continues to move the notch plate 250 in an reverse direction at 336 and repeats through the cycle until the rotational speeds of the plates 210, 250 are unequal. In one embodiment, the repeating cycle is done at a frequency less than ten Hertz, and more particularly, approximately five Hertz. When the respective speeds of the pocket 210 and notch 250 plates are unequal, it means the plates 210, 250 are disconnected from each other, which in turn, means all the struts 234 have been retracted successfully at 344. The method 330 then terminates at 346 system then uses the speeds of the pocket plate and notch plate to determine if there is separation for enough time to ensure that the clutches must be turned off and are not still engaged with the pocket plate.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

We claim:

1. A method for calculating a time for which a force is to be applied to a strut to have the strut lockingly engage a notch of a notch plate having a plurality of notches equidistantly spaced about a surface of the notch plate at a predetermined distance from each other, the method comprising the steps of:
   measuring rotational speed of the notch plate;
   identifying the predetermined distance between the notches in the notch plate;
   dividing the predetermined distance by the measured speed to create a positioning time; and
   adding a pivot time to the positioning time to allow the strut to travel along the notch plate and into the notch a sufficient distance to physically lock a pocket plate and the notch plate together.

2. The method as set forth in claim 1 including the step of converting the measurement of the speed of the notch plate into radians per second.

3. A method for disengaging a clutch by having actuators that move struts against a spring into a notch plate disposed adjacent a pocket plate, having a plurality of pockets, back into pockets of the pocket plate, the method comprising the steps of:
- turning off the actuators;
- moving the notch plate in a direction to allow the struts to be released by the notch plate;
- measuring rotational speeds of the notch and pocket plates; and
- indicating the struts have been retracted out of the notches in the notch plate when the rotational speed of the notch plate does not equal the rotational speed of the pocket plate.

4. A method as set forth in claim 3 wherein the step of moving the notch plate in the direction is iteratively repeated until all of the struts have been retracted.

5. A method as set forth in claim 3 wherein the step of moving the notch plate back and forth is done at a frequency approximately equal to or less than five Hertz.

* * * * *